US010846843B2

(12) United States Patent
Gonzalez et al.

(10) Patent No.: US 10,846,843 B2
(45) Date of Patent: Nov. 24, 2020

(54) UTILIZING ARTIFICIAL INTELLIGENCE WITH CAPTURED IMAGES TO DETECT AGRICULTURAL FAILURE

(71) Applicant: Accenture Global Solutions Limited, Dublin (IE)

(72) Inventors: Adalberto Gonzalez, Nuevo Leon (MX); Badri Lokanathan, Atlanta, GA (US); Artemis Koutsorodi, Chicago, IL (US); Ankur Mathur, Chicago, IL (US); Brandon Webber, Noblesville, IN (US)

(73) Assignee: Accenture Global Solutions Limited, Dublin (IE)

( * ) Notice: Subject to any disclaimer, the term of this patent is extended or adjusted under 35 U.S.C. 154(b) by 169 days.

(21) Appl. No.: 16/224,301

(22) Filed: Dec. 18, 2018

(65) Prior Publication Data
US 2019/0188847 A1   Jun. 20, 2019

(30) Foreign Application Priority Data

Dec. 19, 2017   (EP) .................................... 17386050

(51) Int. Cl.
*G06T 7/00* (2017.01)
*G06K 9/00* (2006.01)
(Continued)

(52) U.S. Cl.
CPC ........ *G06T 7/0008* (2013.01); *G06K 9/00657* (2013.01); *G06K 9/4604* (2013.01);
(Continued)

(58) Field of Classification Search
CPC ............. G06K 9/00657; G06K 9/4604; G06K 9/4633; G06T 2207/30188;
(Continued)

(56) References Cited

U.S. PATENT DOCUMENTS 9,984,455 B1 * 5/2018 Fox ......................... A01G 7/045
10,402,942 B2 * 9/2019 Taipale ............... G06K 9/00657
(Continued)

OTHER PUBLICATIONS

Extended European Search Report for Application No. EP17386050.3, dated May 22, 2018, 11 pages.
(Continued)

*Primary Examiner* — Brandon J Miller
(74) *Attorney, Agent, or Firm* — Harrity & Harrity, LLP

(57) ABSTRACT

A device receives images of a field on a farm, and filters the images of the field to generate filtered images. The device isolates planting lanes in the filtered images, where the planting lanes include lanes formed by crops in the field, and the planting lanes are isolated via a masking technique or a sliding windows technique. The device identifies plant gaps in the planting lanes, where the plant gaps correspond to portions of the planting lanes that are missing crops, the plant gaps are identified based on a heat map when the masking technique is utilized to isolate the planting lanes, and the plant gaps are identified based on sliding windows when the sliding windows technique is utilized to isolate the planting lanes. The device superimposes the plant gaps over the images to generate a visual representation of stressed areas in the field, and performs an action based on the visual representation of the stressed areas.

20 Claims, 11 Drawing Sheets

(51) Int. Cl.
*G06Q 10/06* (2012.01)
*G06T 7/11* (2017.01)
*G06K 9/46* (2006.01)
*G06Q 50/02* (2012.01)

(52) U.S. Cl.
CPC ....... *G06K 9/4633* (2013.01); *G06Q 10/0635* (2013.01); *G06Q 10/06315* (2013.01); *G06T 7/11* (2017.01); *G06Q 50/02* (2013.01); *G06T 2207/10032* (2013.01); *G06T 2207/30188* (2013.01)

(58) Field of Classification Search
CPC ......... G06T 2207/10032; G06T 7/0008; G06T 7/11; G06Q 50/02; G06Q 10/06315; G06Q 10/0635
See application file for complete search history.

(56) References Cited

U.S. PATENT DOCUMENTS

| | | |
|---|---|---|
| 2014/0278640 A1 | 9/2014 | Galloway et al. |
| 2015/0278640 A1 | 10/2015 | Johnson et al. |
| 2015/0324648 A1* | 11/2015 | Wilson ................... G06T 7/536 382/104 |
| 2017/0084039 A1 | 3/2017 | Ritter et al. |
| 2017/0199528 A1* | 7/2017 | Detweiler ............. A01M 21/00 |
| 2018/0082375 A1* | 3/2018 | Greenberg ............... G06K 9/00 |
| 2018/0121726 A1* | 5/2018 | Redden ............. G06K 9/00657 |

OTHER PUBLICATIONS

Guoquan J., et al., "Wheat Rows Detection at the Early Growth Stage Based on Hough Transform and Vanishing Point", Computers and Electronics in Agriculture, Mar. 11, 2016, Elsevier, Netherlands, vol. 123, pp. 211-223, XP029491855.

* cited by examiner

UTILIZING ARTIFICIAL INTELLIGENCE WITH CAPTURED IMAGES TO DETECT AGRICULTURAL FAILURE

RELATED APPLICATION

This application claims priority under 35 U.S.C. § 119 to European Patent Application No. 17386050.3, filed on Dec. 19, 2017, the content of which is incorporated by reference herein in its entirety.

BACKGROUND

Today's farmers are faced with many complex challenges associated with managing large farms. For example, today's farmers have to deal with the rising costs of energy, seeds, chemicals, and equipment; variability in weather and climate change, leading to increased unpredictability in crop yields; and environmental pressures on use of chemicals and water.

SUMMARY

According to some implementations, a device may include one or more memories, and one or more processors, communicatively coupled to the one or more memories, to receive images of a field on a farm, and filter the images of the field to generate filtered images. The one or more processors may isolate planting lanes in the filtered images, where the planting lanes include lanes formed by crops in the field, and the planting lanes are isolated via a masking technique or a sliding windows technique. The one or more processors may identify plant gaps in the planting lanes, where the plant gaps correspond to portions of the planting lanes that are missing crops, the plant gaps are identified based on a heat map when the masking technique is utilized to isolate the planting lanes, and the plant gaps are identified based on sliding windows when the sliding windows technique is utilized to isolate the planting lanes. The one or more processors may superimpose the plant gaps over the images to generate a visual representation of stressed areas in the field, and may perform an action based on the visual representation of the stressed areas.

According to some implementations, a non-transitory computer-readable medium may store instructions that include one or more instructions that, when executed by one or more processors, cause the one or more processors to receive images of a field on a farm, and filter the images of the field to generate filtered images, where each image of the images is filtered in parallel with other images of the images and based on one or more filtering routines. The one or more instructions cause the one or more processors to isolate planting lanes in the filtered images, where the planting lanes include lanes formed by crops in the field, and the planting lanes are isolated via a first technique or a second technique. The one or more instructions cause the one or more processors to identify plant gaps in the planting lanes, where the plant gaps correspond to portions of the planting lanes that are missing crops, the plant gaps are identified based on a third technique when the first technique is utilized to isolate the planting lanes, and the plant gaps are identified based on a fourth technique when the second technique is utilized to isolate the planting lanes. The one or more instructions cause the one or more processors to superimpose the plant gaps over the images to generate a visual representation of stressed areas in the field, and perform an action based on the visual representation of the stressed areas in the field.

According to some implementations, a method may include receiving, by a device, images of a field on a farm, and filtering, by the device, an image, of the images, to generate a filtered image. The method may include isolating, by the device, planting lanes in the filtered image, where the planting lanes include lanes formed by crops in the field, and the planting lanes are isolated via a masking technique or a sliding windows technique. The method may include identifying, by the device, plant gaps in the planting lanes, where the plant gaps correspond to portions of the planting lanes that are missing crops, the plant gaps are identified based on a heat map when the masking technique is utilized to isolate the planting lanes, and the plant gaps are identified based on sliding windows when the sliding windows technique is utilized to isolate the planting lanes. The method may include superimposing, by the device, the plant gaps over the image to generate a visual representation of stressed areas in the field, and performing, by the device, an action based the visual representation of the stressed areas in the field.

DETAILED DESCRIPTION

The following detailed description of example implementations refers to the accompanying drawings. The same reference numbers in different drawings may identify the same or similar elements.

A user (e.g., a farmer) may wish to manage a variety of processes related to agriculture (e.g., irrigation, usage of chemicals, crop harvests, and/or the like). Decision making on a farm is often dependent on an understanding of a variety of factors from information sources that cross a variety of fields. The complexity and quantity of decisions required of a farmer for the successful operation of a farm would benefit from a thorough analysis of a large body of empirical data. However, the collection and analysis of this data would be an impossible task for a single farmer. Furthermore, the large quantity of data cannot be manually processed by humans, and would introduce human subjectivity and waste.

Some implementations described herein provide an agricultural platform that utilizes artificial intelligence with captured images to detect crop failures. The agricultural platform monitors fields of farms via aerial images, and utilizes artificial intelligence to analyze aerial images generated from monitoring the fields and to detect lanes of planted crops (e.g., planting lanes) of the fields. The agricultural platform identifies problems in the crops (e.g., gaps in the planting lanes) due to issues such as emergence failure, pest infestation, and/or disease infestation, assesses economic impacts if the problems are not addressed, and helps farmers perform remedial actions to improve crop yields. By generating detailed insights into the operations and environments of farms, the agricultural platform assists farmers in making data-based operational decisions that optimize crop yields, boost revenues, and minimize expenses, chances of crop failure, and environmental issues.

Figure 1A:
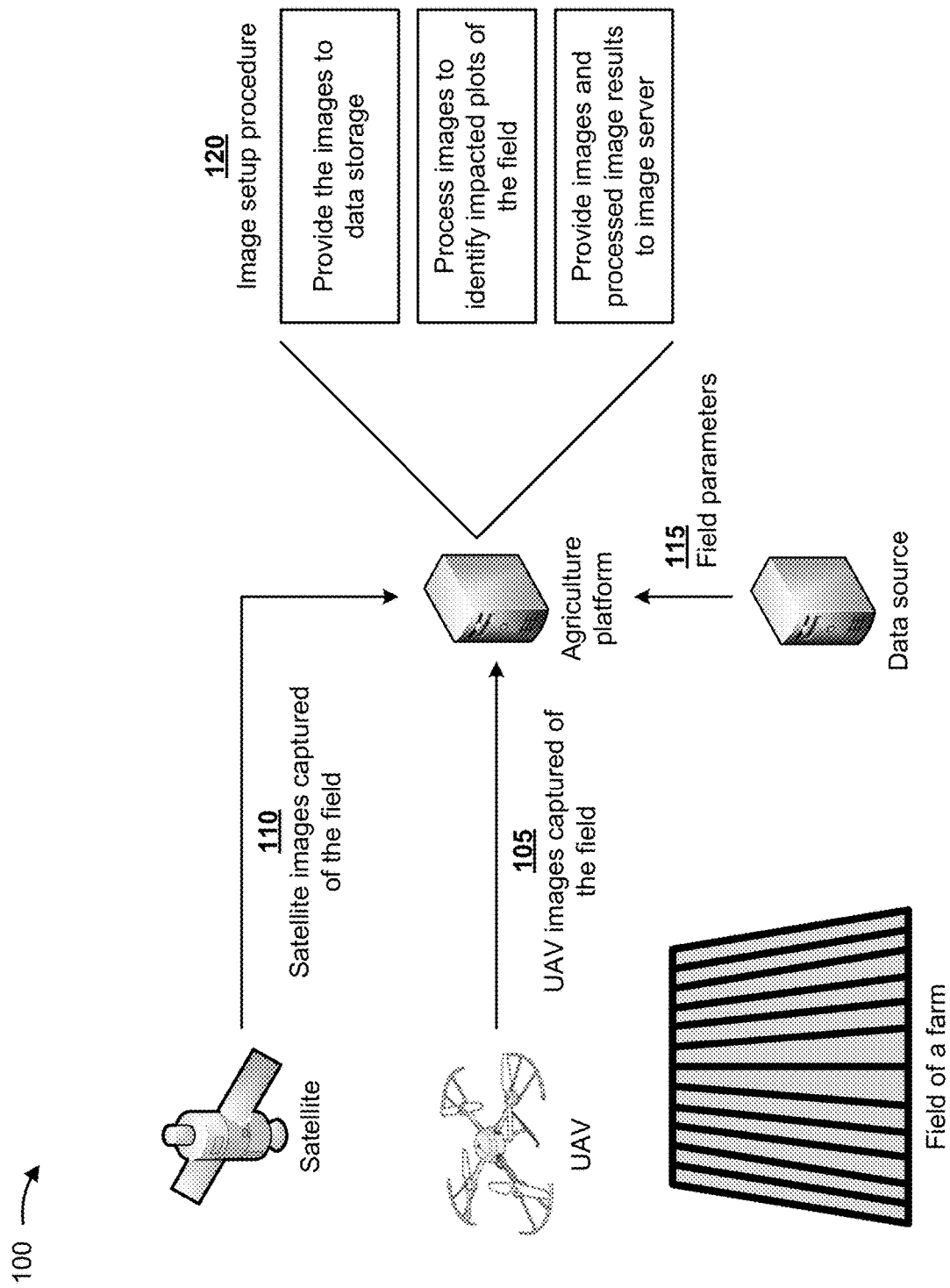
FIGS. 1A-1H are diagrams of an overview of an example implementation described herein.

FIGS. 1A-1H are diagrams of an overview of an example implementation 100 described herein. As shown in FIG. 1A, an unmanned aerial vehicle (UAV), a satellite, and a data source may be associated with an agricultural platform. The UAV may fly over the field and may capture images of the field. The satellite may capture images of the field from space. As further shown in FIG. 1A, and by reference numbers 105 and 110, the UAV may provide UAV images captured of the field to the agricultural platform, and the satellite may provide satellite images captured of the field to the agricultural platform. The agricultural platform may receive the images from the UAV and/or the satellite. In some implementations, the images may be captured using a particular spatial reference (e.g., in decimal degrees, such as provided by the World Geodetic System (WGS) or the European Petroleum Survey Group (EPSG)), and using a particular camera resolution and altitude of capture (e.g., so that resulting ground sample distance (GSD) in the images is less than a particular number of centimeters (e.g., five centimeters) between pixel centers). In some implementations, the images may be orthogonally rectified, stitched, and tiled into a particular resolution (e.g., a 4,000 (4K) resolution or 4K by 4K pixels). In some implementations, capture dates may be associated with images (e.g., in a metadata file associated with the images).

As further shown in FIG. 1A, and by reference number 115, the data source may provide field parameters, associated with the field, to the agricultural platform. The agricultural platform may receive the field parameters, and may store the field parameters in the data storage associated with the agricultural platform. In some implementations, the field parameters may include a planting lane interval parameter that indicates an interval (e.g., a distance) between rows of a crop planted in the field. The planting lane interval parameter may be specific to the crop planted in the field and may vary from a first particular distance (e.g., 0.75 meters) to a second particular distance (e.g., 1.5 meters). In some implementations, the field parameters may include a seed density parameter that is used to determine an emergence ratio of crop plants to seeds planted in the field. Additionally, or alternatively, the field parameters may include a planting date parameter that indicates a date the seeds were planted in the field. Additionally, or alternatively, the field parameters may include a plot boundaries parameter that indicates geographic perimeters of the field (e.g., specified as a coordinate list). The plot boundaries parameter may include information indicating inclusion areas of the field (e.g., an area of the planted crop), and exclusion areas of the field and on which the crop is not planted (e.g., natural objects such as water and rocks, human created areas such as barns and roads, and/or the like). In some implementations, the exclusion areas of the field may be excluded from processing by the agricultural platform.

In some implementations, the images captured by the UAV and/or the satellite may be provided by the UAV and/or the satellite to another device (e.g., an image server), and the agricultural platform may receive the images from the other device. In some implementations, and as shown by reference number 120 in FIG. 1A, the agricultural platform may receive the images captured by the UAV and/or the satellite, and may store the images in data storage associated with the agricultural platform. In such implementations, the agricultural platform may process the images, as described elsewhere herein, to identify impacted plots of the field, and may provide the images and results of processing the images to the other device (e.g., the image server).

Figure 1B:
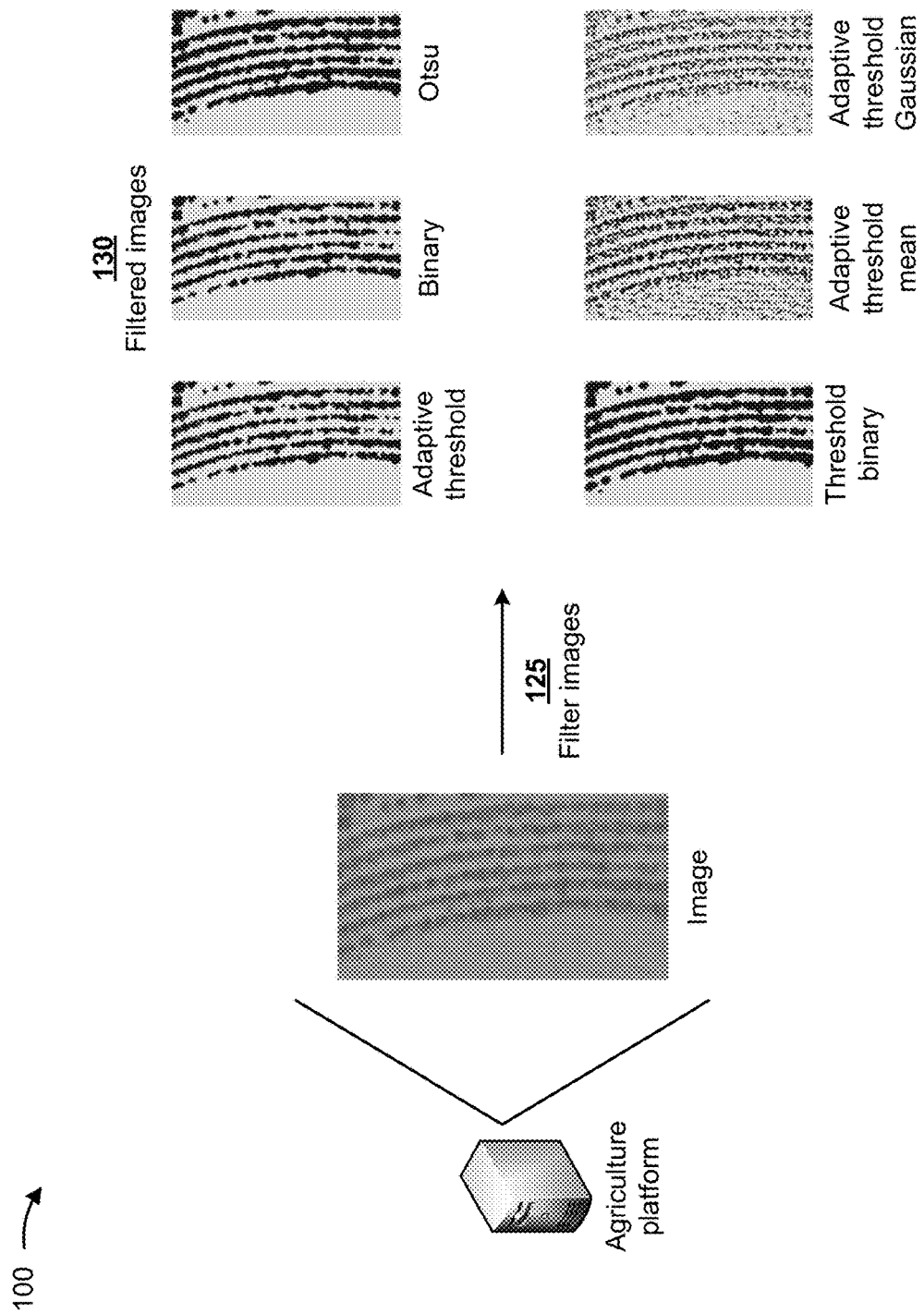

As shown in FIG. 1B, and by reference number 125, the agricultural platform may filter the images captured by the UAV and/or the satellite. In some implementations, and as shown by reference number 130, the agricultural platform may utilize a variety of techniques to filter the images and produce filtered images. In some implementations, the agricultural platform may filter the images to eliminate noise in the images. Eliminating noise in the images may enable the agricultural platform to more accurately identify crop features, detect planting lanes (e.g., also referred to as lanes or crop lanes), detect missing plants (e.g., gaps) in the planting lanes, and/or the like. In some implementations, the agricultural platform may filter each image into black and white based on a variety of filtering routines, such as an adaptive threshold filtering routine, a binary filtering routine, a threshold binary filtering routine, an Otsu filtering routine, an adaptive threshold mean filtering routine, an adaptive threshold Gaussian filtering routine, and/or the like.

In some implementations, the adaptive threshold filtering routine may take a grayscale or color image as input, and may output a binary image representing a segmentation. For each pixel in the image, a threshold is calculated. If a pixel value is below the threshold, the pixel value is set to a background value. If the pixel value is equal to or above the threshold, the pixel value is set to a foreground value. In some implementations, the threshold for the adaptive threshold filtering routine may be determined based on a Chow and Kaneko technique (e.g., which divides an image into an array of overlapping subimages, finds an optimum threshold for each subimage based on its histogram, and determines a threshold for each pixel is by interpolating results of the subimages), a local thresholding technique (e.g., which determines a threshold for each pixel based on statistically examining intensity values of a local neighborhood of each pixel), and/or the like.

In some implementations, the binary filtering routine may morphologically filter binary structures or objects in the images. The binary filtering routine may utilize binary filters, of a particular size (e.g., three pixel by three pixel filters), that consider defined values not equal to zero in the image as true values and zero values in the image as false values. Depending on a number and a position of true and false values of a central pixel and its neighboring pixels, a binary number may be produced that determines whether a true (e.g., 1) or a false (e.g., 0) should be returned for the pixel in the filtered image.

In some implementations, the threshold binary filtering routine may take a grayscale image as input, and output a binary image by applying a global threshold. A global threshold is a threshold that is the same throughout the image, as opposed to a threshold that differs based on factors such as a location of a pixel in the image. In threshold binary filtering, a comparison is performed of each pixel intensity value and the threshold, and pixels that exceed the threshold may be assigned a non-zero value (e.g., white) and pixels that do not exceed the threshold may be assigned a zero value (e.g., black). Alternatively, pixels that exceed the threshold may be assigned a zero value (e.g., black) and pixels that do not exceed the threshold value may be assigned a non-zero value (e.g., white).

In some implementations, the Otsu filtering routine may take a grayscale bimodal image as input, and output a binary image by applying an optimal global threshold. A bimodal image is an image that has two classes of pixels (e.g., foreground pixels and background pixels) such that a histogram of the image has two separate peaks. In the Otsu filtering routine, an optimal threshold is calculated based on separating the two classes so that their combined spread (e.g., intra-class variance) is minimal, or equivalently because the sum of pairwise squared distances is constant, so that their inter-class variance is maximal.

In some implementations, the adaptive threshold mean filtering routine may take a grayscale or color image as input, and may output a binary image based on applying an adaptive threshold that varies per different regions within the image. In this case, the adaptive threshold mean filtering routine may apply a threshold value for a particular region based on a mean value of all pixels within the particular region. For example, pixels within a particular region that exceed the mean value of the pixels within the particular region may be assigned a non-zero value (e.g., white) and pixels within the particular region that do not exceed the mean value of pixels within the particular region may be assigned a zero value (e.g., black).

In some implementations, the adaptive threshold Gaussian filtering routine may take a grayscale or color image as input, and may output a binary image based on applying an adaptive threshold that varies per different regions within the image. In this case, the adaptive threshold Gaussian filtering routine may apply a threshold value for a particular region based on a Gaussian weighted average value for all pixels within the particular region. For example, pixels within a particular region that exceed the Gaussian weighted average value of the pixels in the particular region may be assigned a non-zero value (e.g., white) and pixels within the particular region that do not exceed the Gaussian weighted average of the pixels in the particular region may be assigned a zero value (e.g., black).

In some implementations, the agricultural platform may select and configure the filtering routines based on factors associated with the field, such as a crop type, a growth stage of the crop, and/or the like. In some implementations, the agricultural platform may select and configure the filtering routines based on a data-driven training technique. In some implementations, the data-driven training technique may include a machine learning technique (e.g., a neural network technique, a deep learning technique, and/or the like), a trial-and-error calibration technique using training data sets of sample images, a combination of the machine learning technique and the trial-and-error calibration technique, and/or the like.

Figure 1C:
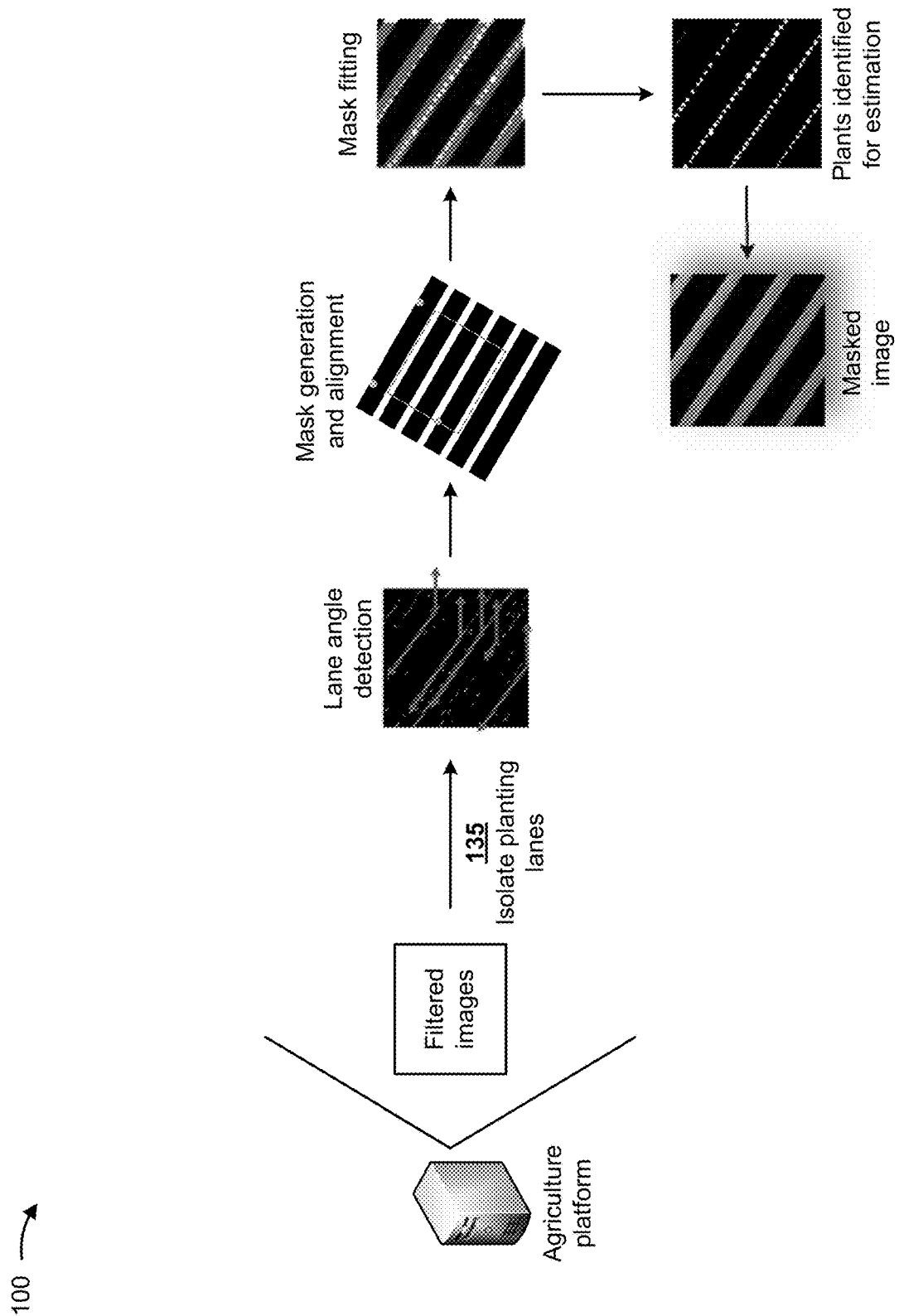

As shown in FIG. 1C, and by reference number 135, the agricultural platform may utilize the filtered images to isolate planting lanes in the filtered images. In some implementations, the techniques described in connection with FIG. 1C may be utilized when crops are planted (e.g., in planting lanes) in standard patterns in a field, such as in straight lines, circular furrows, and/or the like (e.g., as indicated by the field parameters or as determined based on the agricultural platform analyzing the filtered images). When using such techniques, the agricultural platform may apply pre-defined masks to the filtered images, and may align the pre-defined masks with the filtered images so that that planting lanes are not masked (e.g., are in focus) for gap identification.

For example, as shown in FIG. 1C, the agricultural platform may utilize lane angle detection to detect an angle of the planting lanes in a filtered image. In some implementations, the lane angle detection may include an artificial intelligence technique, such as a color selection technique, a Canny edge technique, a region of interest technique, a Hough transform line detection technique, and/or the like. In some implementations, the color selection technique may include identifying the planting lanes and the angle of the planting lanes based on colors of the filtered images.

In some implementations, the Canny edge technique may include identifying the planting lanes and the angle of the planting lanes based on an upper threshold and a lower threshold. If a pixel gradient is higher than the upper threshold, then the pixel is accepted as an edge (e.g., the planting lane). If a pixel gradient value is below the lower threshold, then the pixel is rejected as an edge. If the pixel gradient is between the two thresholds, then the pixel is accepted as an edge if the pixel is connected to a pixel that is above the upper threshold.

In some implementations, the region of interest technique may include identifying the planting lanes and the angle of the planting lanes based on focusing on an area of interest in the filtered images (e.g., a portion of the field where the planting lanes are located). In some implementations, the Hough transform line detection technique may include identifying the planting lanes and the angle of the planting lanes based on determining imperfect instances of objects (e.g., in an image) within a certain class of shapes by a voting procedure. The voting procedure may be carried out in a parameter space, from which object candidates are obtained as local maxima in an accumulator space that is constructed by the Hough transform.

In some implementations, as further shown in FIG. 1C, the agricultural platform may generate a mask based on the angle of the planting lanes determined by the lane angle detection. The agricultural platform may align the mask with the filtered image based on the angle of the planting lanes, and may fit the mask to the filtered image based on aligning the mask with the filtered image. The agricultural platform may identify the plants based on the mask being fitted with the filtered image. In some implementations, the agricultural platform may identify the plants based on a deep learning technique (e.g., a faster regional convolutional neural networks (R-CNN) technique, a you only look once (YOLO) technique, a single shot detectors technique, and/or the like), an open source computer vision (OpenCV) technique, and/or the like. As further shown in FIG. 1C, the agricultural platform may generate a masked image that includes the mask fitted with the filtered image.

Figure 1D:
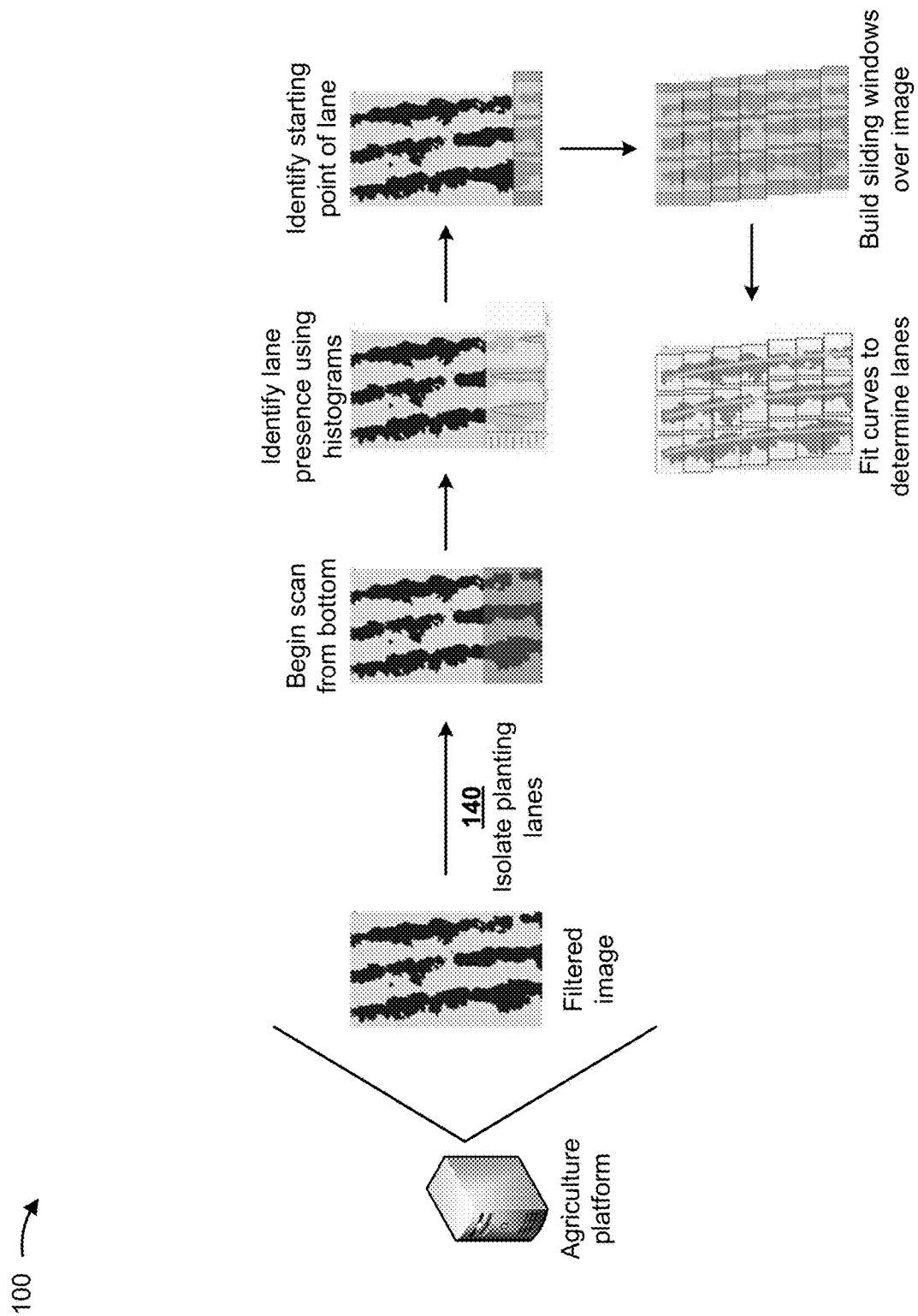

As shown in FIG. 1D, and by reference number 140, the agricultural platform may utilize the filtered images to isolate planting lanes in the filtered images. In some implementations, the techniques described in connection with FIG. 1D may be utilized when planting lanes have arbitrary patterns and need to be identified from the filtered images (e.g., as indicated by the field parameters or as determined based on the agricultural platform analyzing the filtered images). For example, as further shown in FIG. 1D, the agricultural platform may begin a scan of a filtered image from a bottom portion of the filtered image. In some implementations, the agricultural platform may identify crops in the scan of the filtered image based on distinguishing black pixels from grey or white pixels in the scan of the filtered image. In some implementations, the agricultural platform may create histograms for adjacent black pixels in the scan of the filtered image, and may identify planting lanes in the scan of the filtered image based on the histograms.

In some implementations, as further shown in FIG. 1D, the agricultural platform may identify starting points of the planting lanes based on the scan of the filtered image. The agricultural platform may continue to scan portions of the filtered image upwards from the bottom portion of the filtered image until the agricultural platform completely scans the filtered image. In some implementations, the agricultural platform may create sliding windows over the scanned portions of the filtered image so that the windows cover the filtered image. A sliding window may include a region of a fixed width and length that slides across the filtered image. For each window, the agricultural platform may utilize the window region and may apply an image classifier to determine if the window has an object of interest (e.g., a crop plant, a planting lane, and/or the like). In some implementations, the agricultural platform may utilize a variety of image classifiers to determine if the window contains an object of interest (e.g., a crop plant, a planting lane, and/or the like). For example, the agricultural platform may utilize a histogram of oriented gradients (HOG) classifier, a support vector machines (SVM) classifier, a Haar cascade classifier, a convolution neural network classifier, and/or the like.

In some implementations, as further shown in FIG. 1D, the agricultural platform may fit curves to the windows created over the filtered image so that the fitted curves track the crop plants in the filtered image. In such implementations, the agricultural platform may fit curves to the windows by constructing curves, or mathematical functions, that have best fits to series of data points (e.g., pixels in the filtered image). In some implementations, the curve fitting may involve interpolation (e.g., where an exact fit to the data is required), smoothing (e.g., in which a smooth function is constructed that approximately fits the data), regression analysis (e.g., which focuses on questions of statistical inference such as how much uncertainty is present in a curve that is fit to data observed with random errors), and/or the like. The agricultural platform may determine the planting lanes in the filtered image based on the curves fitted to the windows created over the filter image.

Figure 1E:
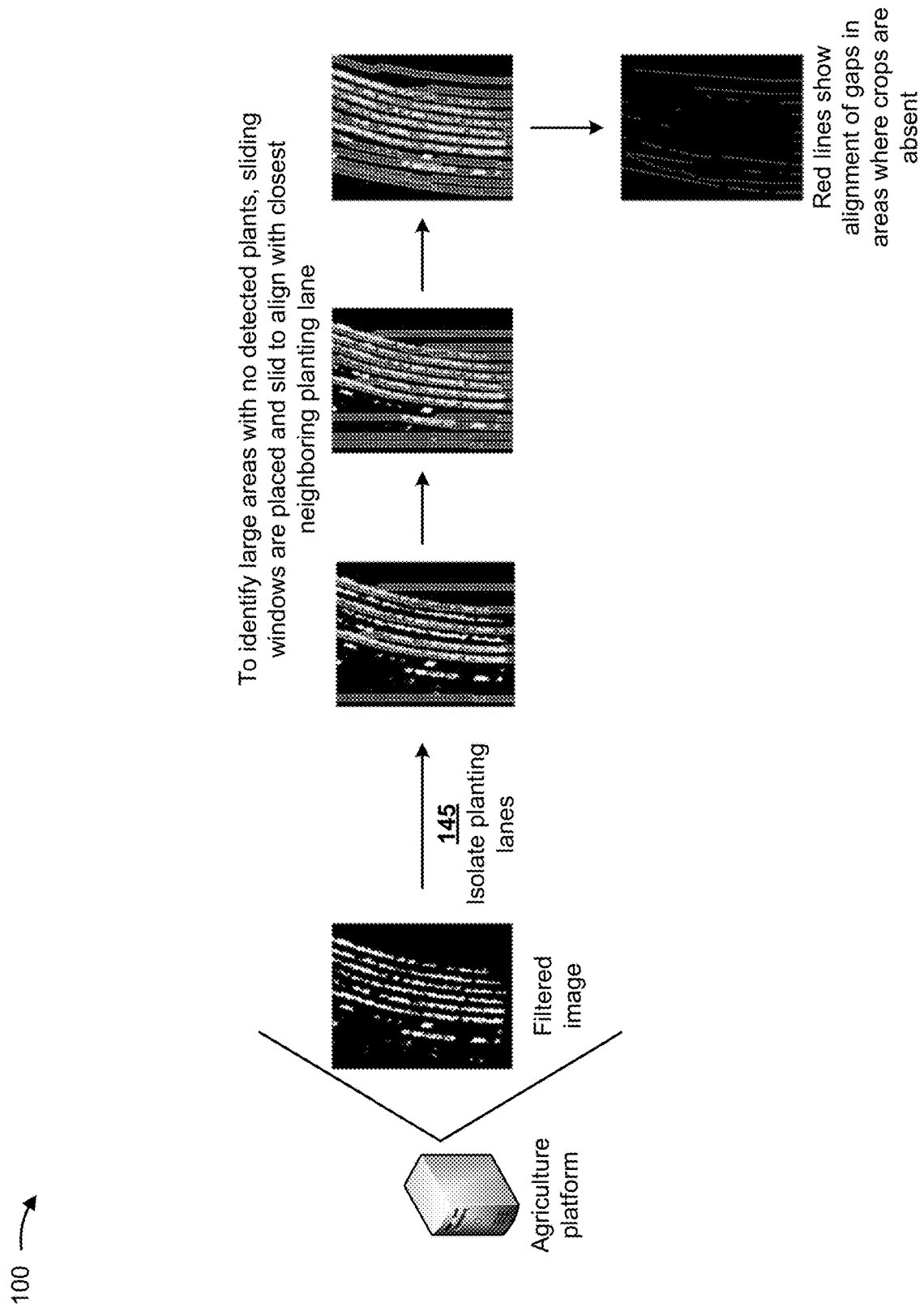

As shown in FIG. 1E, and by reference number 145, the agricultural platform may utilize the filtered images to isolate planting lanes in the filtered images. In some implementations, the techniques described in connection with FIG. 1E may be utilized when planting lanes have arbitrary patterns and need to be identified from the filtered images. In some implementations, and as shown in FIG. 1E, the agricultural platform may place sliding windows in the filtered image, and may slide each window until each window aligns with a closest neighboring planting lane in the filtered image. In such implementations, the agricultural platform may utilize a variety of image classifiers to determine if each window contains an object of interest (e.g., a crop plant, a planting lane, and/or the like). For example, the agricultural platform may utilize a HOG classifier, a SVM classifier, a Haar cascade classifier, a convolution neural network classifier, and/or the like.

In such implementations, the agricultural platform may identify large areas with no detected crop plants based on sliding each window until each window aligns with the closest neighboring planting lane in the filtered image. As further shown in FIG. 1E, based on the sliding windows, the agricultural platform may generate an image that includes a black background (e.g., indicating areas with no detected crop plants) and red lines (e.g., indicating planting lanes). The generated image may also include gaps in the red lines which indicate areas where crop plants are missing (e.g., plant gaps).

Figure 1F:
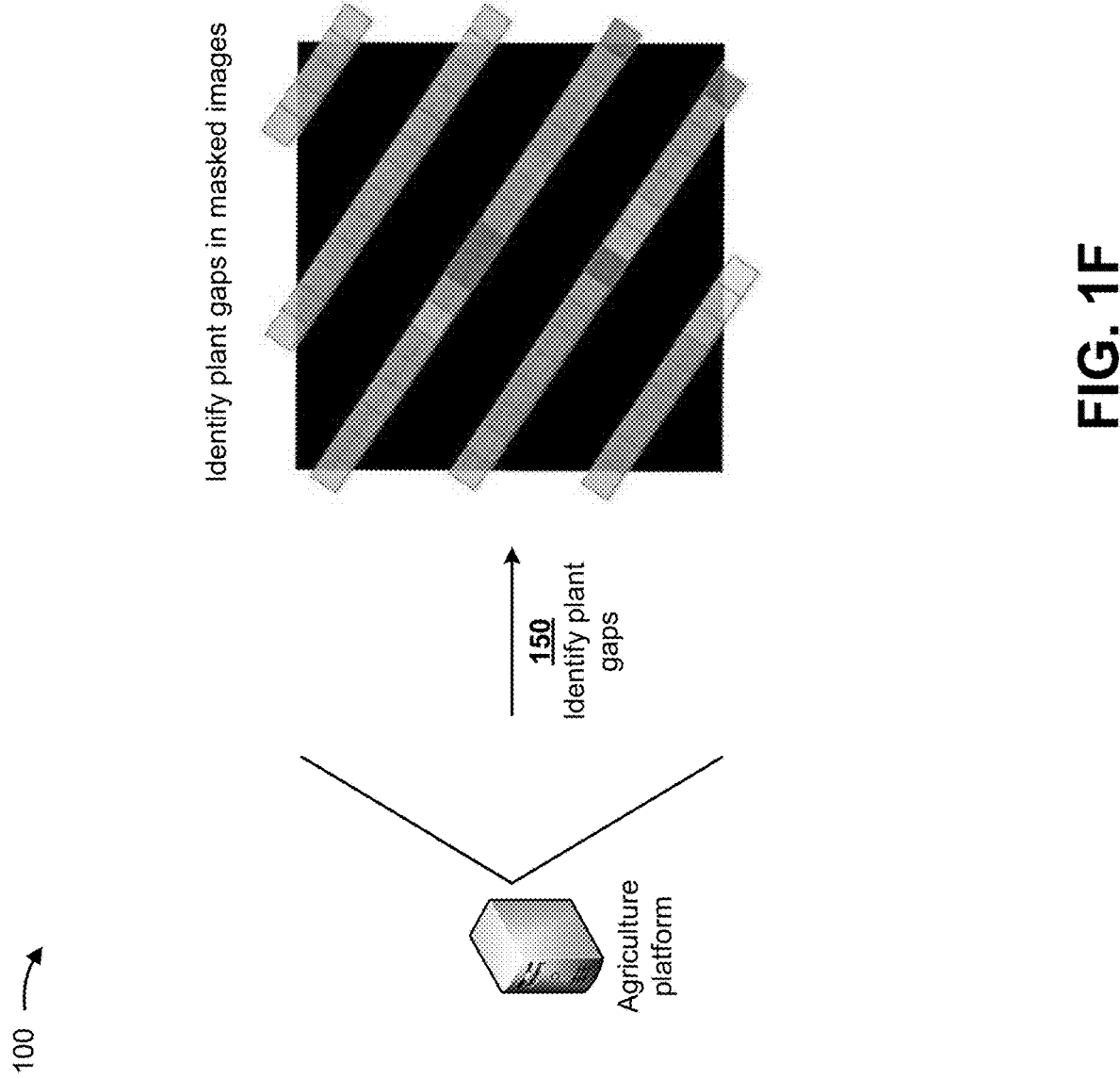

As shown in FIG. 1F, and by reference number 150, the agricultural platform may identify plant gaps in the planting lanes when masks are applied to the filtered images, as described above in connection with FIG. 1C. In some implementations, the techniques described in connection with FIG. 1F may be utilized when crops are planted in standard patterns in a field, such as in straight lines, circular furrows, and/or the like, and when the techniques described above in connection with FIG. 1C are utilized.

As further shown in FIG. 1F, the agricultural platform may identify plant gaps in the masked images generated by the agricultural platform from the filtered images. In some implementations, the agricultural platform may superimpose a gridded heat map on the identified planting lanes in the masked images in order to identify the plant gaps in the field. In such implementations, each grid of the gridded heat map may be a particular size and may provide an estimate of plant growth levels at a portion of the identified planting lanes. Each grid of the gridded heat map may include a particular color that provides the estimate of the plant growth levels of the portion of the identified planting lanes. For example, a green color may be used to indicate a highest plant growth level in a portion of the identified planting lanes, a yellow color may be used to indicate a plant growth level that is less than the plant growth level associated with the green color, an orange color may be used to indicate a plant growth level that is less than the plant growth level associated with the yellow color, and a red color may be used to indicate a lowest plant growth level in a portion of the identified planting lanes (e.g., a plant growth level that is less than the plant growth level associated with the orange color). In some implementations, contiguous red colored grids (e.g., red lines) that are greater than a predetermined length may provide an indication of plant gaps in the planting lanes of the field.

In some implementations, the agricultural platform may utilize different colors in the gridded heat map to represent plant growth levels in the identified planting lanes. In some implementations, the agricultural platform may utilize a visualization other than a gridded heat map to identify the plant gaps in the field, such as a hot spot map, a quilt plot, and/or the like.

Figure 1G:
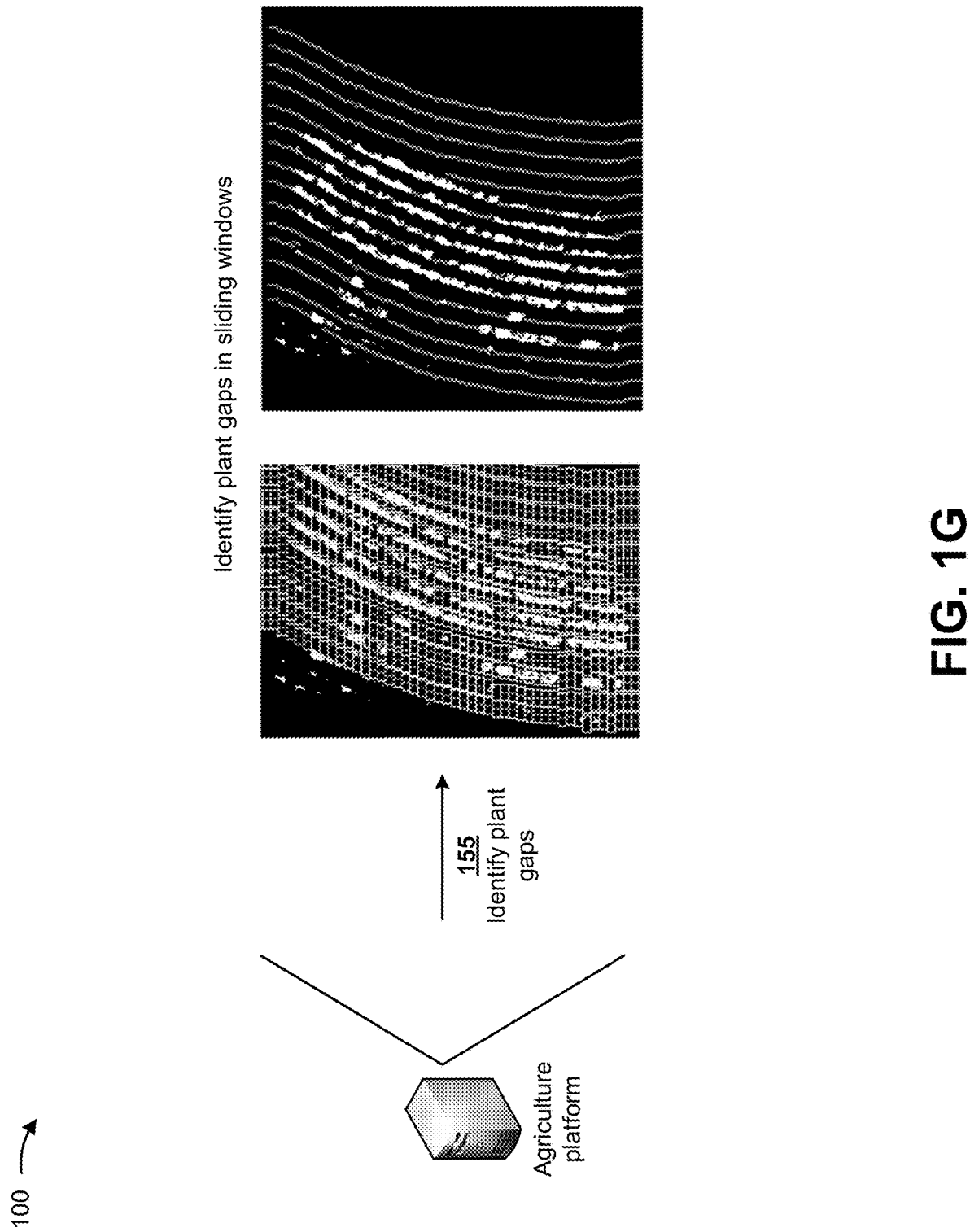

As shown in FIG. 1G, and by reference number 155, the agricultural platform may identify plant gaps in the planting lanes when sliding windows are applied to the filtered images, as described above in connection with FIGS. 1D and 1E. In some implementations, the techniques described in connection with FIG. 1G may be utilized when planting lanes have arbitrary patterns and need to be identified from the filtered images, and when the techniques described above in connection with FIGS. 1D and/or 1E are utilized.

As further shown in FIG. 1G, the agricultural platform may identify plant gaps in the sliding windows generated by the agricultural platform based on the filtered images. In some implementations, the agricultural platform may determine whether each sliding window includes plants or does not include plants. In such implementations, the agricultural platform may utilize a variety of image classifiers to determine if each sliding window includes plants or does not include plants. For example, the agricultural platform may utilize a HOG classifier, a SVM classifier, a Haar cascade classifier, a convolution neural network classifier, and/or the like. In some implementations, and with reference to the filtered image shown in FIG. 1G, if a sliding window includes white pixels, the agricultural platform may determine that the sliding window includes plants. In some implementations, if a sliding window does not include any white pixels, the agricultural platform may determine that the sliding window does not include plants and may replace the sliding window with red pixels. In such implementations, the red pixels (or red lines) may provide an indication of plant gaps in the planting lanes of the field.

Figure 1H:
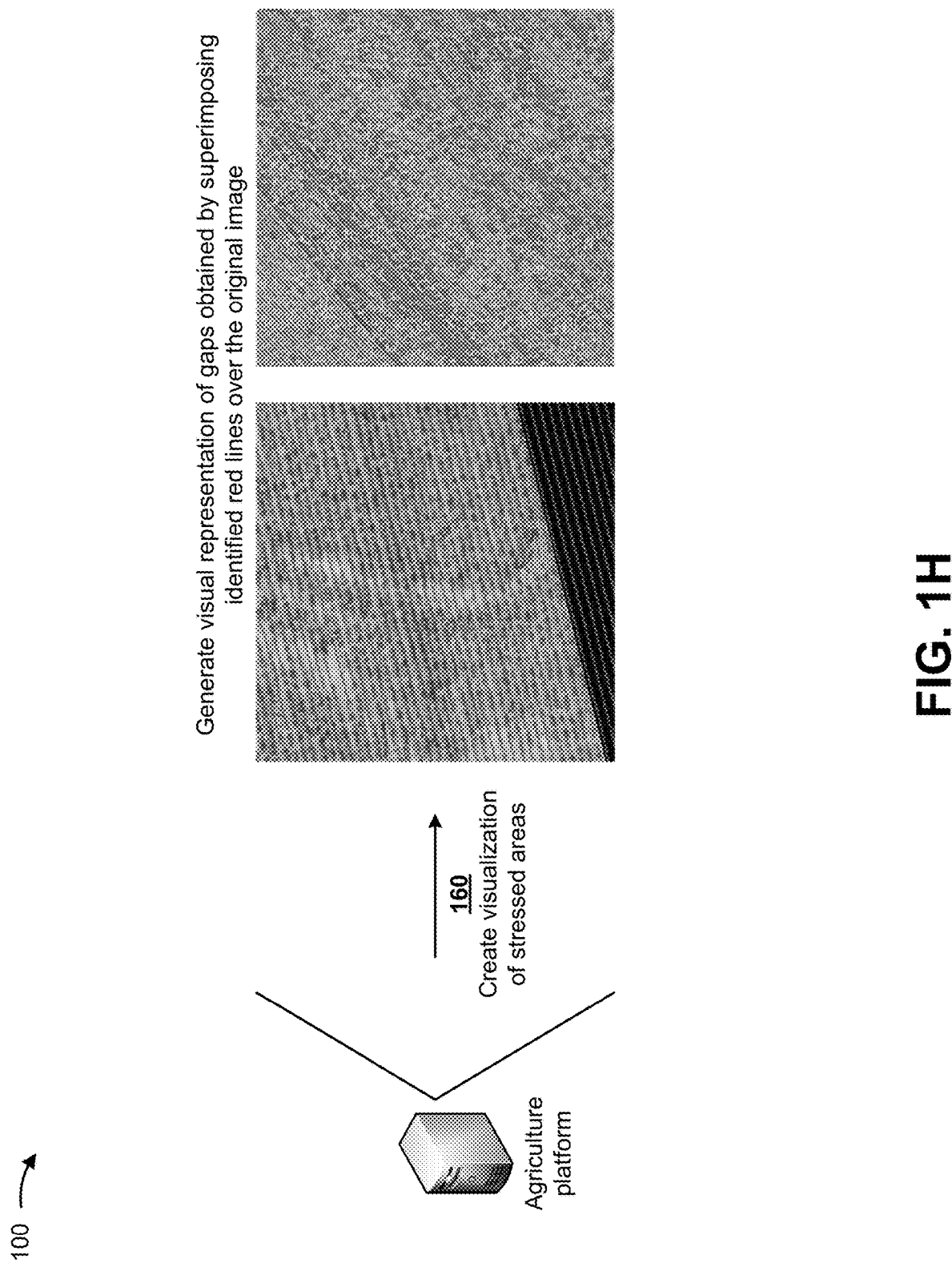

As shown in FIG. 1H, and by reference number 160, the agricultural platform may generate a visual representation of the plant gaps in the field by superimposing the red lines (e.g., generated as described above in connection with FIGS. 1F and 1G) over an original image of the field. In some implementations, the agricultural platform may dynamically widen the red lines in the visual representation when zooming out of the visual representation in order to highlight stress areas of the field at a macroscopic level. This may enable a farmer to determine an extent and a location of a crop failure. In some implementations, a shape of the crop failure may provide an indication of a cause of the crop failure. For example, regular shaped patterns of crop failure (e.g., straight lines or concentric circles) may indicate farming process causes of the crop failure, such as irrigation failure, planting equipment failure, and/or the like. Whereas, irregular shaped patterns of crop failure may indicate various non-farming process causes, such as pest infestation, spot irrigation issues, and/or the like. In some implementations, the agricultural platform may further track the farming process causes and/or the non-farming process causes of the crop failure via temporal analysis (e.g., based on analyzing and processing future images of the field, the particular area of the field associated with the crop failure, and/or the like).

In some implementations, the agricultural platform may provide the visual representation of the plant gaps in the field for display to a user (e.g., a farmer who owns and/or maintains the field) of the agricultural platform, via a user device, such as a mobile device, a tablet computer, a desktop computer, and/or the like. In some implementations, the agricultural platform may provide any of the information set forth in FIGS. 1B-1G for display to the user of the agricultural platform. In some implementations, the agricultural platform may provide the visual representation of the plant gaps in the field and/or the information set forth in FIGS. 1B-1G to data storage associated with the agricultural platform. In some implementations, the agricultural platform may provide the visual representation of the plant gaps in the field and/or the information set forth in FIGS. 1B-1G to another device (e.g., an image server) associated with the agricultural platform. In such implementations, a user (e.g., the farmer) may register with the image server so that the user may utilize a user device to access, from the image server, the visual representation of the plant gaps in the field and/or the information set forth in FIGS. 1B-1G. In some implementations, the agricultural platform and/or the image server may store images (e.g., of a farm) captured at different points in time and processed so that the user can visualize temporal views of the farm at an appropriate granularity of display.

In some implementations, the agricultural platform may generate and provide (e.g., for display) analytics associated with processing the images of the field. For example, the agricultural platform may calculate lengths of the planting lanes and/or the plant gaps, and may provide the lengths as outputs to the user. In some implementations, the agricultural platform may compare the calculated lengths of the planting lanes and/or the plant gaps with predetermined thresholds (e.g., a predetermined planting lane length, a predetermined plant gap length, and/or the like). If a calculated length of a planting lane fails to satisfy (e.g., is less than) the predetermined threshold, the agricultural platform may generate and provide an alert to the user. If a calculated length of a plant gap fails to satisfy (e.g., is greater than) the predetermined threshold, the agricultural platform may generate and provide an alert to the user.

In some implementations, the agricultural platform may calculate an economic impact (e.g., a loss in revenue) of the plant gaps (e.g., the non-emergence of plants), and may output information indicating the economic impact to the user. For example, if the agricultural platform determines that the plant gaps represent twenty percent of a total area of the crop, the agricultural platform may determine that the plant gaps may contribute to a twenty percent loss in revenue from the crop. In some implementations, the agricultural platform may estimate an economic benefit (e.g., a recouping of the lost revenue) of addressing the plant gaps via additional watering, replanting, fertilizers, pesticides, and/or the like, and may output information indicating the economic benefit to the user.

In some implementations, the agricultural platform may provide, for display to the user, information associated with the plant gaps. For example, the agricultural platform may send an alert to a user device associated with the user when a number of identified plant gaps or a function of a number of identified plant gaps (e.g., a percentage, a ratio, etc.) exceeds a threshold. In this case, the threshold may be associated with an indication of a problem or potential problem in the field. In some implementations, the threshold may be user configurable. For example, a farmer may modify the threshold, increase or decrease the threshold, set rules or parameters on which the threshold is to be determined or functions by which the threshold is to be calculated, and/or the like.

As another example, the agricultural platform may send, to a user device associated with the user, information indicating where a particular plant gap is located. As yet another example, the agricultural platform may send, to a user device associated with the user, information indicating an expected cause of a particular plant gap (e.g., disease, pests, not enough water, too much water, etc.). As still another example, the agricultural platform may send, to a user device associated with the user, information indicating upcoming weather patterns. In this case, the agricultural platform may also send, to the user device, information indicating whether the upcoming weather patterns are expected to increase or decrease the plant gap. As another example, the agricultural platform may send, to a user device associated with the user, information requesting whether a farmer wants the agricultural platform to automatically address the plant gap.

In some implementations, the agricultural platform may cause one or more actions to be performed in order to address an agricultural issue. For example, the agricultural platform may cause an irrigation system to provide more water to an affected area, such as when the agricultural platform determines that the plant gap may be caused by not enough water. Similarly, the agricultural platform may cause the irrigation system to provide less water to the affected area, such as when the agricultural platform determines that the plant gap may be caused by too much water. In some implementations, the agricultural platform may cause the irrigation system to be employed, reprogrammed, rescheduled, and/or the like, such as to add, subtract, or modify times during which the system is operated, amounts of water to be applied during operation, and/or the like.

As another example, the agricultural platform may cause a UAV, a drone, or a driverless vehicle to apply fertilizer to an affected area, may cause a UAV, a drone, or a driverless vehicle to increase the fertilizer applied to the affected area, may cause a UAV, a drone, or a driverless vehicle to decrease the fertilizer applied to the affected area, and/or the like. As yet another example, the agricultural platform may cause a UAV, a drone, or a driverless vehicle to apply insecticide to an affected area, may cause a UAV, a drone, or a driverless vehicle to increase the insecticide applied to the affected area, may cause a UAV, a drone, or a driverless vehicle to decrease the insecticide applied to the affected area, and/or the like. As still another example, the agricultural platform may cause a UAV, a drone, or a driverless vehicle to plant more seeds in an affected area, may cause a UAV, a drone, or a driverless vehicle to increase a number of seeds planted in the affected area, may cause a UAV, a drone, or a driverless vehicle to decrease a number of seeds planted in the affected area, and/or the like. As another example, the agricultural platform may cause a UAV, a drone, or a driverless vehicle to plant more crops in an affected area, may cause a UAV, a drone, or a driverless vehicle to increase a number of crops planted in the affected area, may cause a UAV, a drone, or a driverless vehicle to decrease a number of crops planted in the affected area, may cause a UAV, a drone, or a driverless vehicle to remove, relocate, replace, replant, prune, thin, append to, and/or the like the crops.

In some implementations, the agricultural platform may provide recommendations to perform an action, such as by a user of the user device, a farmer, or other worker associated with agricultural operations, to address an agricultural issue. For example, the agricultural platform may provide a recommendation to perform any one or more of the actions described above or elsewhere herein. As another example, the agricultural platform may provide a recommendation to acquire new agricultural equipment (e.g., systems, machinery, vehicles, tools, etc.), or to modify or enhance existing agricultural equipment to add additional features, capabilities, or the like. As another example, the agricultural platform may automatically send a communication (e.g., an email, a message, etc.), or automatically schedule an action (e.g., a meeting, an order, an operation, etc.) to be performed, such as via an electronic calendar.

In some implementations, the agricultural platform may utilize multicore processing capabilities to perform the processing described herein in parallel and reduce execution times associated with processing the images captured by the UAV and/or the satellite. For example, the agricultural platform may divide the captured images into 4K by 4K pixel tiles, and may utilize, as input, a set of tiles that geometrically intersect a boundary of the field. In such an example, the agricultural platform may process each tile in parallel on as many cores as available for processing. When all of the tiles are processed, the agricultural platform may generate, as output, results aggregated from all of the tiles generated based on the images of the field.

In this way, the agricultural platform may automatically utilize artificial intelligence to process and analyze a large quantity of image data, which cannot be manually processed by humans. Thus, the agricultural platform removes human subjectivity and waste from the process, improves speed and efficiency of the process, and conserves computing resources (e.g., processors, memory, and/or the like). Furthermore, implementations described herein use a rigorous, computerized process to perform tasks (e.g., processing and analysis of a large quantity of image data) that were previously unable to be performed using subjective human intuition or input. The agricultural platform may provide farmers with timely insights for making objection operational decisions about a large farming tract of land, such as reseeding, replanting, applying chemical treatments (e.g., insecticide, fertilizer, and/or the like), providing irrigation, and/or the like over the large farming tract of land. The agricultural platform provides temporal pattern visualization of a farm at a scale that enables a farmer to identify underlying patterns or problems that cannot be identified through manual data processing, such as patterns indicating irrigation failure or infestation, patterns indicating potential pest infestations, patterns indicating optimum crop health, patterns indicating optimum health of livestock, and/or the like. Finally, outputs of the agricultural platform may be utilized to automate field treatment processes using suitable agricultural equipment.

As indicated above, FIGS. 1A-1H are provided merely as examples. Other examples are possible and may differ from what was described with regard to FIGS. 1A-1H.

Figure 2:
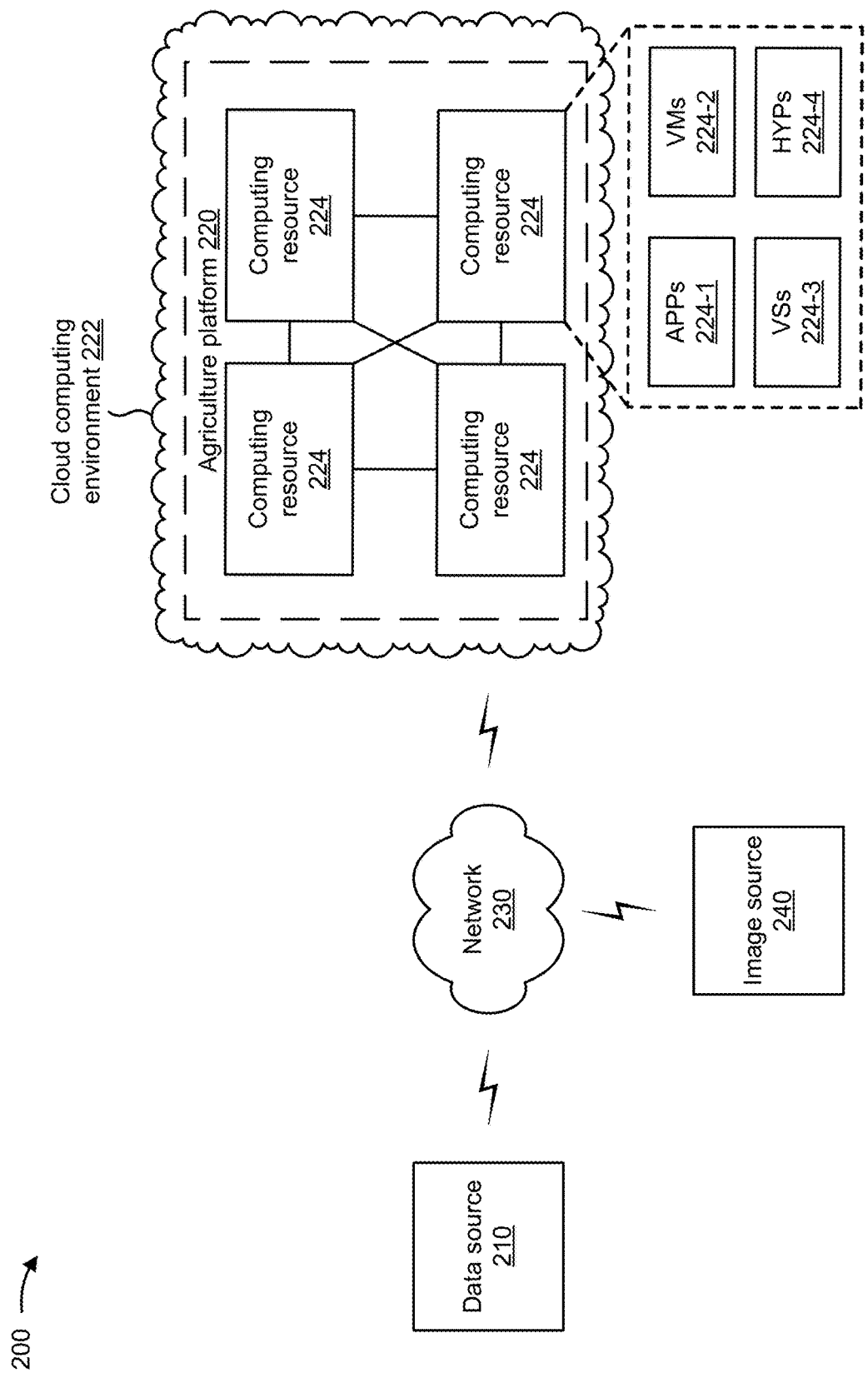
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a data source 210, an agricultural platform 220, a network 230, and an image source 240. Devices of environment 200 may interconnect via wired connections, wireless connections, or a combination of wired and wireless connections.

Data source 210 includes one or more devices capable of receiving, generating, storing, processing, and/or providing information, such as information described herein. For example, data source 210 may include a mobile phone (e.g., a smart phone, a radiotelephone, and/or the like), a laptop computer, a tablet computer, a desktop computer, a handheld computer, a server device, or a similar type of device, which provides the field parameters to agricultural platform 220. In some implementations, data source 210 may receive information from and/or transmit information to agricultural platform 220.

Agricultural platform 220 includes one or more devices that utilizes artificial intelligence with captured images to detect agricultural failure. In some implementations, agricultural platform 220 may be designed to be modular such that certain software components may be swapped in or out depending on a particular need. As such, agricultural platform 220 may be easily and/or quickly reconfigured for different uses. In some implementations, agricultural platform 220 may receive information from and/or transmit information to one or more data sources 210 and/or image sources 240.

In some implementations, as shown, agricultural platform 220 may be hosted in a cloud computing environment 222. Notably, while implementations described herein describe agricultural platform 220 as being hosted in cloud computing environment 222, in some implementations, agricultural platform 220 may not be cloud-based (i.e., may be implemented outside of a cloud computing environment) or may be partially cloud-based.

Cloud computing environment 222 includes an environment that hosts agricultural platform 220. Cloud computing environment 222 may provide computation, software, data access, storage, and/or the like services that do not require end-user knowledge of a physical location and configuration of system(s) and/or device(s) that hosts agricultural platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host agricultural platform 220. The cloud resources may include compute instances executing in computing resource 224, storage devices provided in computing resource 224, data transfer devices provided by computing resource 224, and/or the like. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by a user of agricultural platform 220. Application 224-1 may eliminate a need to install and execute the software applications on a user device associated with the user of agricultural platform 220. For example, application 224-1 may include software associated with agricultural platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., an operator of agricultural platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Image source 240 includes a device that is capable of communicating with one or more other devices included in environment 200. For example, image source 240 may include a UAV, a satellite, a server device (e.g., an image server), or a similar type device.

The UAV may include an aircraft without a human pilot aboard, and may also be referred to as an unmanned aircraft (UA), a drone, a remotely piloted vehicle (RPV), a remotely piloted aircraft (RPA), or a remotely operated aircraft (ROA). In some implementations, the UAV may include a variety of shapes, sizes, configurations, characteristics, and/or the like for a variety of purposes and applications. In some implementations, the UAV may include one or more sensors, such as electromagnetic spectrum sensors (e.g., visual spectrum, infrared, or near infrared cameras, radar systems, and/or the like); biological sensors; chemical sensors; and/or the like. In some implementations, the UAV may utilize one or more of the aforementioned sensors to sense (or detect) and avoid an obstacle in or near a flight path of the UAV, to capture images, and/or the like. In some implementations, the UAV may be controlled by agricultural platform 220 via communications with agricultural platform 220. Additionally, or alternatively, the UAV may be controlled by the computational resources of the UAV.

The satellite may include a satellite provided in a space-based satellite navigation system (e.g., a global positioning system (GPS)) that provides location and/or time information in all weather conditions, anywhere on or near the Earth where there is an unobstructed line of sight to four or more satellites (e.g., GPS satellites).

In some implementations, agricultural platform 220 associated with a system of automated devices, such as a UAV, a robot, an automated irrigation system, a driverless vehicle (e.g., a driverless tractor to plow a field, a driverless vehicle to bring farm supplies to a field, and/or other driverless farm equipment), that perform an action (e.g., apply water, fertilizer, seeds, plants, insecticide, and/or the like to a field) at the instruction of agricultural platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
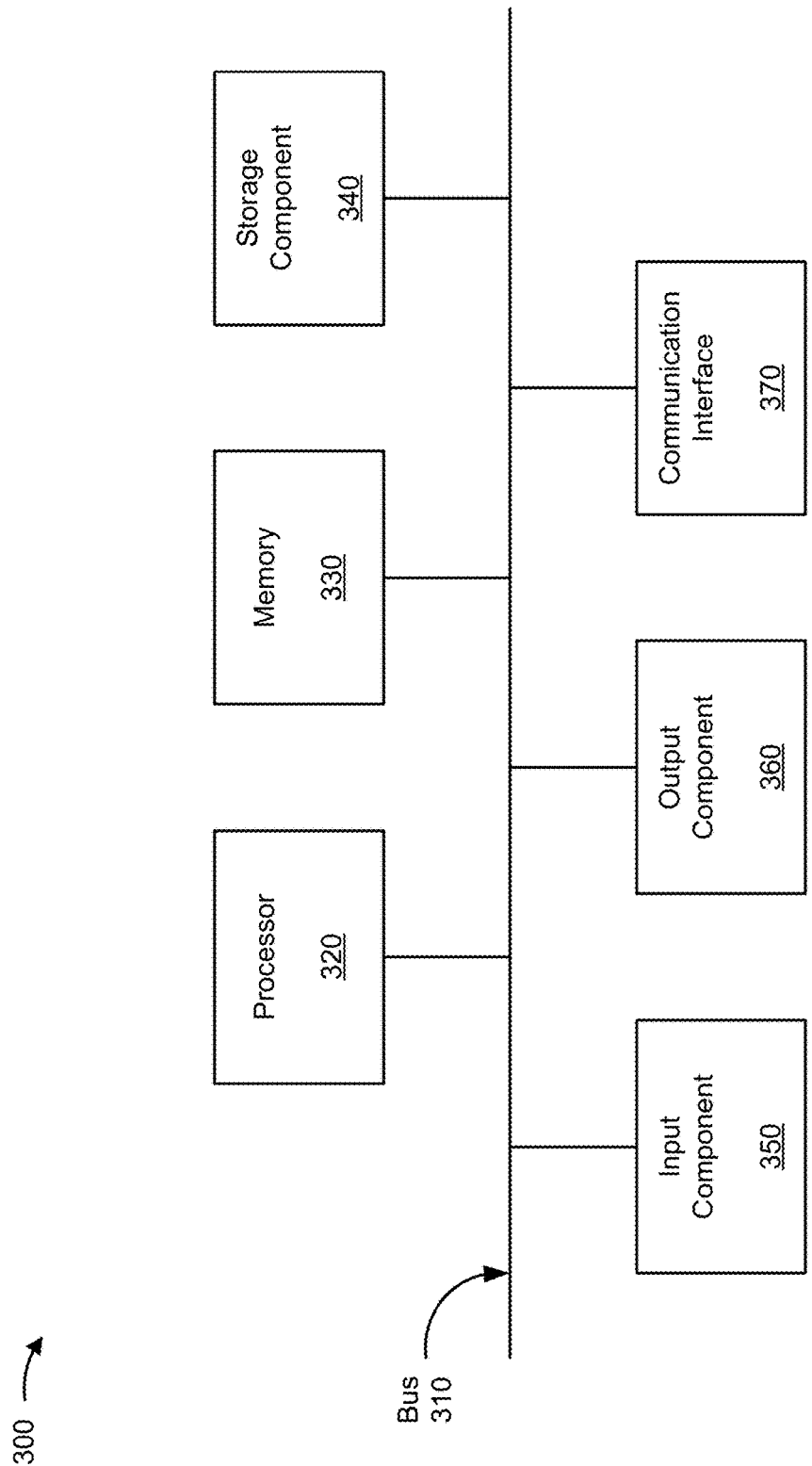
FIG. 3 is a diagram of example components of one or more devices of FIG. 2.

FIG. 3 is a diagram of example components of a device 300. Device 300 may correspond to data source 210, agricultural platform 220, computing resource 224, and/or image source 240. In some implementations, data source 210, agricultural platform 220, computing resource 224, and/or image source 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
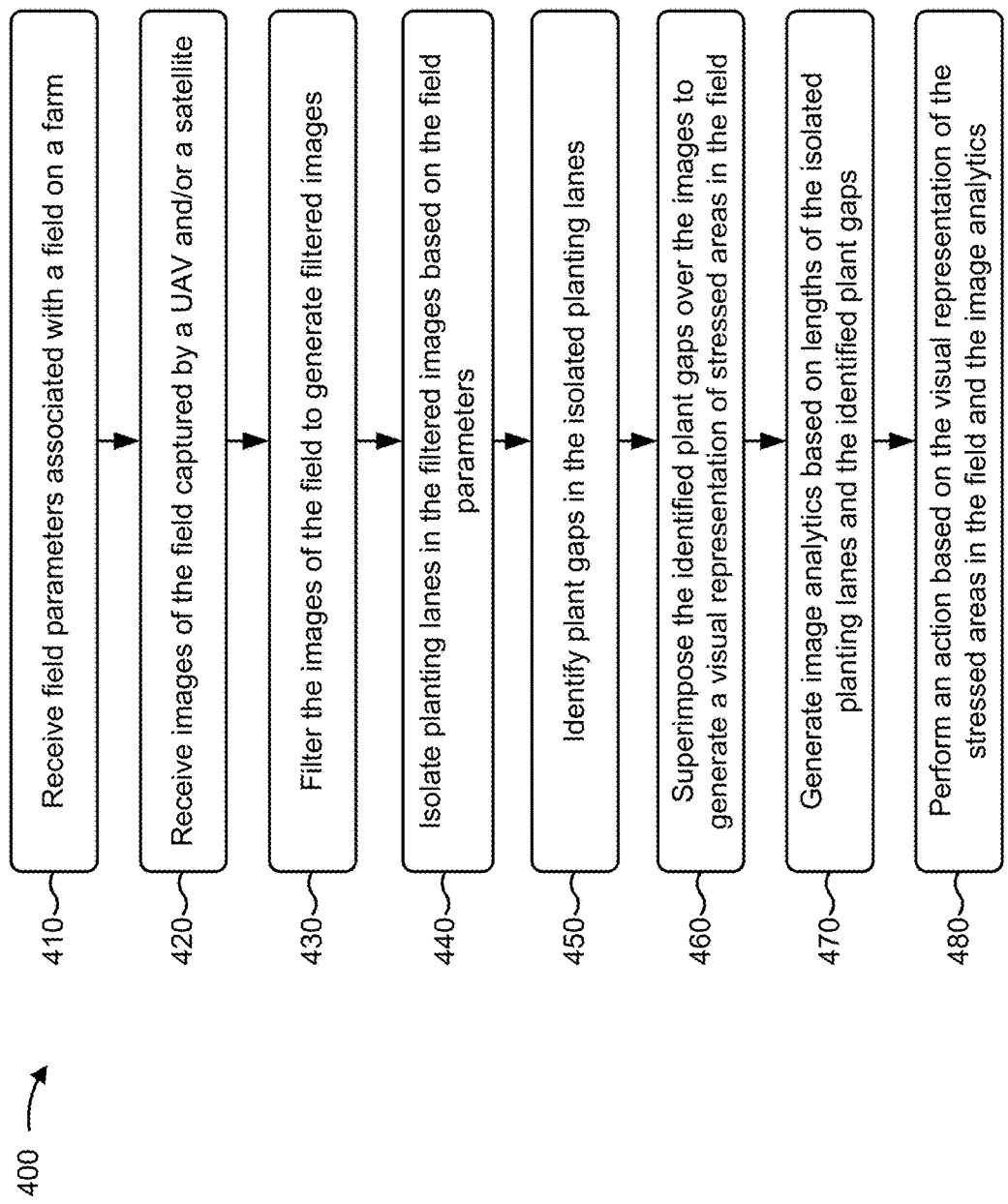
FIG. 4 is a flow chart of an example process for utilizing artificial intelligence with captured images to detect agricultural failure.

FIG. 4 is a flow chart of an example process 400 for utilizing artificial intelligence with captured images to detect agricultural failure. In some implementations, one or more process blocks of FIG. 4 may be performed by agricultural platform 220. In some implementations, one or more process blocks of FIG. 4 may be performed by another device or a group of devices separate from or including agricultural platform 220, such as data source 210.

As shown in FIG. 4, process 400 may include receiving field parameters associated with a field on a farm (block 410). For example, agricultural platform 220 may receive field parameters associated with a field on a farm. In some implementations, data source 210 may provide field parameters, associated with the field, to agricultural platform 220. Agricultural platform 220 may receive the field parameters, and may store the field parameters in the data storage associated with agricultural platform 220. In some implementations, the field parameters may include a planting lane interval parameter that indicates an interval (e.g., a distance) between rows of a crop planted in the field. The planting lane interval parameter may be specific to the crop planted in the field and may vary from a first particular distance (e.g., 0.75 meters) to a second particular distance (e.g., 1.5 meters). Additionally, or alternatively, the field parameters may include a seed density parameter that is used to determine an emergence ratio of crop plants to seeds planted in the field. Additionally, or alternatively, the field parameters may include a planting date parameter that indicates a date the seeds were planted in the field. Additionally, or alternatively, the field parameters may include a plot boundaries parameter that indicates geographic perimeters of the field (e.g., specified as a coordinate list). The plot boundaries parameter may include information indicating inclusion areas of the field (e.g., an area of the planted crop), and exclusion areas of the field and on which the crop is not planted (e.g., natural objects such as water and rocks, human created areas such as barns and roads, and/or the like). In some implementations, the exclusion areas of the field may be excluded from processing by agricultural platform 220.

In this way, agricultural platform 220 may receive the field parameters associated with the field on the farm.

As further shown in FIG. 4, process 400 may include receiving images of the field captured by a UAV and/or a satellite (block 420). For example, agricultural platform 220 may receive images of the field captured by UAV 240 and/or satellite 240. In some implementations, UAV 240 may fly over the field and may capture images of the field. Satellite 240 may capture images of the field from space. UAV 240 may provide UAV images captured of the field to agricultural platform 220, and satellite 240 may provide satellite images captured of the field to agricultural platform 220. Agricultural platform 220 may receive the images from UAV 240 and/or satellite 240.

In some implementations, the images may be captured using a particular spatial reference (e.g., in decimal degrees, such as provided by the WGS or the EPSG), and using a particular camera resolution and altitude of capture (e.g., so that resulting GSD in the images is less than a particular number of centimeters (e.g., five centimeters) between pixel centers). In some implementations, the images may be orthogonally rectified, stitched, and tiled into a particular resolution (e.g., a 4K resolution or 4K by 4K pixels). In some implementations, capture dates may be associated with images (e.g., in a metadata file associated with the images).

In this way agricultural platform 220 may receive the images of the field captured by UAV 240 and/or satellite 240.

As further shown in FIG. 4, process 400 may include filtering the images of the field to generate filtered images (block 430). For example, agricultural platform 220 may filter the images of the field to generate filtered images. In some implementations, agricultural platform 220 may utilize a variety of techniques to filter the images and produce filtered images. In some implementations, agricultural platform 220 may filter the images to eliminate noise in the images. Eliminating noise in the images may enable agricultural platform 220 to more accurately identify crop features, detect planting lanes (e.g., also referred to as lanes or crop lanes), detect missing plants (e.g., gaps) in the planting lanes, and/or the like.

In some implementations, agricultural platform 220 may filter each image into black and white based on a variety of filtering routines, such as an adaptive threshold filtering routine, a binary filtering routine, an Otsu filtering routine, a threshold binary filtering routine, an adaptive threshold mean filtering routine, an adaptive threshold Gaussian filtering routine, and/or the like. In some implementations, agricultural platform 220 may select and configure the filtering routines based on factors associated with the field, such as a crop type, a growth stage of the crop, and/or the like. In some implementations, agricultural platform 220 may select and configure the filtering routines based on a data-driven training technique. In some implementations, the data-driven training technique may include a machine learning technique (e.g., a neural network technique, a deep learning technique, and/or the like), a trial-and-error calibration technique using training data sets of sample images, a combination of the machine learning technique and the trial-and-error calibration technique, and/or the like.

In this way, agricultural platform 220 may filter the images of the field to generate the filtered images.

As further shown in FIG. 4, process 400 may include isolating planting lanes in the filtered images based on the field parameters (block 440). For example, agricultural platform 220 may isolate planting lanes in the filtered images based on the field parameters. In some implementations, when crops are planted in standard patterns in a field, such as in straight lines, circular furrows, and/or the like (e.g., as indicated by the field parameters or as determined based on agricultural platform 220 analyzing the filtered images), agricultural platform 220 may apply pre-defined masks to the filtered images, and may align the pre-defined masks with the filtered images so that that planting lanes are not masked (e.g., are in focus) for gap identification.

In such implementations, agricultural platform 220 may utilize lane angle detection to detect an angle of the planting lanes in a filtered image. The lane angle detection may include an artificial intelligence technique, such as a color selection technique, a Canny edge technique, a region of interest technique, a Hough transform line detection technique, and/or the like. Agricultural platform 220 may generate a mask based on the angle of the planting lanes determined by the lane angle detection. Agricultural platform 220 may align the mask with the filtered image based on the angle of the planting lanes, and may fit the mask to the filtered image based on aligning the mask with the filtered image. Agricultural platform 220 may identify the plants based on the mask being fitted with the filtered image. Agricultural platform 220 may identify the plants based on a deep learning technique (e.g., a faster R-CNN technique, a YOLO technique, a single shot detectors technique, and/or the like), an OpenCV technique, and/or the like.

In some implementations, when planting lanes have arbitrary patterns and need to be identified from the filtered images (e.g., as indicated by the field parameters or as determined based on agricultural platform 220 analyzing the filtered images), agricultural platform 220 may begin a scan of a filtered image from a bottom portion of the filtered image. Agricultural platform 220 may identify crops in the scan of the filtered image based on distinguishing black pixels from grey or white pixels in the scan of the filtered image. Agricultural platform 220 may create histograms for adjacent black pixels in the scan of the filtered image, and may identify planting lanes in the scan of the filtered image based on the histograms.

Agricultural platform 220 may identify starting points of the planting lanes based on the scan of the filtered image. Agricultural platform 220 may continue to scan portions of the filtered image upwards from the bottom portion of the filtered image until agricultural platform 220 completely scans the filtered image. Agricultural platform 220 may create sliding windows over the scanned portions of the filtered image so that the windows cover the filtered image. A sliding window may include a region of a fixed width and length that slides across the filtered image. For each window, agricultural platform 220 may utilize the window region and may apply an image classifier to determine if the window has an object of interest (e.g., a crop plant, a planting lane, and/or the like). Agricultural platform 220 may utilize a variety of image classifiers to determine if the window contains an object of interest (e.g., a crop plant, a planting lane, and/or the like). For example, agricultural platform 220 may utilize a HOG classifier, a SVM classifier, a Haar cascade classifier, a convolution neural network classifier, and/or the like.

Agricultural platform 220 may fit curves to the windows created over the filtered image so that the fitted curves track the crop plants in the filtered image. Agricultural platform 220 may fit curves to the windows by constructing curves, or mathematical functions, that have best fits to series of data points (e.g., pixels in the filtered image). The curve fitting may involve interpolation, smoothing, regression analysis, and/or the like. Agricultural platform 220 may determine the planting lanes in the filtered image based on the curves fitted to the windows created over the filter image.

In some implementations, when planting lanes have arbitrary patterns and need to be identified from the filtered images (e.g., as indicated by the field parameters or as determined based on agricultural platform 220 analyzing the filtered images), agricultural platform 220 may place sliding windows in the filtered image, and may slide each window until each window aligns with a closest neighboring planting lane in the filtered image. Agricultural platform 220 may utilize a variety of image classifiers to determine if each window contains an object of interest (e.g., a crop plant, a planting lane, and/or the like). For example, agricultural platform 220 may utilize a HOG classifier, a SVM classifier, a Haar cascade classifier, a convolution neural network classifier, and/or the like.

Agricultural platform 220 may identify large areas with no detected crop plants based on sliding each window until each window aligns with the closest neighboring planting lane in the filtered image. Based on the sliding windows, agricultural platform 220 may generate an image that includes a black background (e.g., indicating areas with no detected crop plants) and red lines (e.g., indicating planting lanes). The generated image may also include gaps in the red lines which indicate areas where crop plants are missing (e.g., plant gaps).

In this way, agricultural platform 220 may isolate the planting lanes in the filtered images based on the field parameters.

As further shown in FIG. 4, process 400 may include identifying plant gaps in the isolated planting lanes (block 450). For example, agricultural platform 220 may identify plant gaps in the isolated planting lanes. In some implementations, when masks are applied to the filtered images, agricultural platform 220 may superimpose a gridded heat map on the identified planting lanes in the masked images in order to identify the plant gaps in the field. Each grid of the gridded heat map may be a particular size and may provide an estimate of plant growth levels at a portion of the identified planting lanes. Each grid of the gridded heat map may include a particular color that provides the estimate of the plant growth levels of the portion of the identified planting lanes. For example, a green color may be used to indicate a highest plant growth level in a portion of the identified planting lanes, a yellow color may be used to indicate a plant growth level that is less than the plant growth level associated with the green color, an orange color may be used to indicate a plant growth level that is less than the plant growth level associated with the yellow color, and a red color may be used to indicate a lowest plant growth level in a portion of the identified planting lanes. Contiguous red colored grids (e.g., red lines) that are greater than a predetermined length may provide an indication of plant gaps in the planting lanes of the field.

In some implementations, when sliding windows are applied to the filtered images, agricultural platform 220 may identify plant gaps in the sliding windows generated by agricultural platform 220 based on the filtered images. Agricultural platform 220 may determine whether each sliding window includes plants or does not include plants. Agricultural platform 220 may utilize a variety of image classifiers to determine if each sliding window includes plants or does not include plants. For example, agricultural platform 220 may utilize a HOG classifier, a SVM classifier, a Haar cascade classifier, a convolution neural network classifier, and/or the like. If a sliding window includes white pixels, agricultural platform 220 may determine that the sliding window includes plants. If a sliding window does not include any white pixels, agricultural platform 220 may determine that the sliding window does not include plants and may replace the sliding window with red pixels. The red pixels (or red lines) may provide an indication of plant gaps in the planting lanes of the field.

In this way, agricultural platform 220 may identify the plant gaps in the isolated planting lanes.

As further shown in FIG. 4, process 400 may include superimposing the identified plant gaps over the images to generate a visual representation of stressed areas of the field (block 460). For example, agricultural platform 220 may superimpose the identified plant gaps over the images to generate a visual representation of stressed areas of the field. In some implementations, agricultural platform 220 may generate the visual representation of the plant gaps in the field by superimposing the red lines over an original image of the field. Agricultural platform 220 may dynamically widen the red lines in the visual representation when zooming out of the visual representation in order to highlight stress areas of the field at a macroscopic level. This may enable a farmer to determine an extent and a location of a crop failure. A shape of the crop failure may provide an indication of a cause of the crop failure. For example, regular shaped patterns of crop failure (e.g., straight lines or concentric circles) may indicate human causes of the crop failure, such as irrigation failure, planting equipment failure, and/or the like. Whereas, irregular shaped patterns of crop failure may indicate various causes, such as pest infestation, spot irrigation issues, and/or the like.

In this way, agricultural platform 220 may superimpose the identified plant gaps over the images to generate the visual representation of the stressed areas of the field.

As further shown in FIG. 4, process 400 may include generating image analytics based on lengths of the isolated planting lanes and the identified plant gaps (block 470). For example, agricultural platform 220 may generate image analytics based on lengths of the isolated planting lanes and the identified plant gaps. In some implementations, agricultural platform 220 may generate and provide (e.g., for display) analytics associated with processing the images of the field. For example, agricultural platform 220 may calculate lengths of the planting lanes and/or the plant gaps, and may provide the lengths as outputs to the user. Agricultural platform 220 may compare the calculated lengths of the planting lanes and/or the plant gaps with predetermined thresholds (e.g., a predetermined planting lane length, a predetermined plant gap length, and/or the like). If a calculated length of a planting lane fails to satisfy (e.g., is less than) the predetermined threshold, agricultural platform 220 may generate and provide an alert to the user. If a calculated length of a plant gap fails to satisfy (e.g., is greater than) the predetermined threshold, agricultural platform 220 may generate and provide an alert to the user.

In this way, agricultural platform 220 may generate the image analytics based on the lengths of the isolated planting lanes and the identified plant gaps.

As further shown in FIG. 4, process 400 may include performing an action based on the visual representation of the stressed areas in the field and the image analytics (block 480). For example, agricultural platform 220 may perform an action based on the visual representation of the stressed areas in the field and the image analytics. In some implementations, agricultural platform 220 may provide the image analytics and the visual representation of the plant gaps in the field for display to a user (e.g., a farmer who owns and/or maintains the field) of agricultural platform 220, via a user device. Agricultural platform 220 may provide the image analytics and the visual representation of the plant gaps in the field to data storage associated with agricultural platform 220. Agricultural platform 220 may provide the image analytics and the visual representation of the plant gaps in the field to another device (e.g., an image server) associated with agricultural platform 220. A user (e.g., the farmer) may register with the image server so that the user may utilize a user device to access, from the image server, the image analytics and the visual representation of the plant gaps in the field.

In some implementations, agricultural platform 220 may perform an automated action, or cause an automated action to be performed, based on the visual representation of the stressed areas in the field and the image analytics and in order to address the stressed areas of the field. For example, agricultural platform 220 may cause an irrigation system to turn on or turn off (e.g., to provide more or less water to the stressed areas), may cause a UAV or a robot to gather further information about the stressed areas of the field (e.g., the plant gaps), may cause a robot or a driverless vehicle to perform an action on the soil of the stressed areas to make them less stressed (e.g., toiling the soil, raking the soil, and/or the like), may cause a robot, a UAV, or a driverless vehicle to add something to the soil of the stressed areas to make them less stressed (e.g., add fertilizer to the soil of the stressed areas, add insecticide to the soil of the stressed areas, and/or the like), may cause a robot, a UAV, or a driverless vehicle to apply more seeds, plant more crops, replant crops, and/or the like to the stressed areas, and/or the like.

In this way, agricultural platform 220 may perform an action based on the visual representation of the stressed areas in the field and the image analytics.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide an agricultural platform that utilizes artificial intelligence with captured images to detect crop failures. The agricultural platform monitors fields of farms via aerial images, and utilizes artificial intelligence to analyze aerial images generated from monitoring the fields and to detect lanes of planted crops (e.g., planting lanes) of the fields. The agricultural platform identifies problems in the crops (e.g., gaps in the planting lanes) due to issues such as emergence failure, pest infestation, and/or disease infestation, assesses economic impacts if the problems are not addressed, and helps farmers perform remedial actions to improve crop yields. By generating detailed insights into the operations and environments of farms, the agricultural platform assists farmers in making data-based operational decisions that optimize crop yields, boost revenues, and minimize expenses, chances of crop failure, and environmental issues.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, and/or the like). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
   receive a plurality of images of a field on a farm;
   filter the plurality of images of the field to generate a plurality of filtered images;
   isolate planting lanes in the plurality of filtered images,
      the planting lanes including lanes formed by crops in the field, and
      the planting lanes being isolated via:
         a masking technique, or
         a sliding windows technique;
   identify plant gaps in the planting lanes,
      the plant gaps corresponding to portions of the planting lanes that are missing crops,
      the plant gaps being identified based on a heat map when the masking technique is utilized to isolate the planting lanes, and
      the plant gaps being identified based on sliding windows when the sliding windows technique is utilized to isolate the planting lanes;
   superimpose the plant gaps over the plurality of images to generate a visual representation of stressed areas in the field; and
   perform an action based on the visual representation of the stressed areas.

2. The device of claim 1, where the one or more processors are further to:

receive field parameters associated with the field; and
where the one or more processors, when isolating the planting lanes in the plurality of filtered images, are to:
isolate the planting lanes in the plurality of filtered images based on the field parameters.

3. The device of claim 1, where the one or more processors are further to:
analyze the plurality of filtered images;
determine, based on analyzing the plurality of filtered images, whether the planting lanes include standard patterns or arbitrary patterns; and
where, when isolating the planting lanes in the plurality of filtered images, the one or more processors are to one of:
isolate the planting lanes in the plurality of filtered images via the masking technique when the planting lanes include the standard patterns; or
isolate the planting lanes in the plurality of filtered images via the sliding windows technique when the planting lanes include the arbitrary patterns.

4. The device of claim 1, where the one or more processors are further to:
generate image analytics based on one or more lengths of the isolated planting lanes and the identified plant gaps, the image analytics including calculated lengths of isolated planting lanes or the identified plant gaps; and
perform one or more actions based on the image analytics, the one or more actions including at least one of:
providing the image analytics for display,
comparing calculated lengths of isolated planting lanes and/or the identified plant gaps with one or more predetermined thresholds, or
providing an alert if the calculated length of an isolated planting lane or an identified plant gap fails to meet the one or more predetermined thresholds.

5. The device of claim 1, where the action includes at least one of:
dispatching another device to reseed crops in the plant gaps,
dispatching the other device to replant crops in the plant gaps,
causing an irrigation system to increase a water supply to the plant gaps,
causing the irrigation system to decrease the water supply to the plant gaps,
dispatching the other device to apply fertilizer in the plant gaps, or
dispatching the other device to apply an insecticide in the plant gaps.

6. The device of claim 1, where the one or more processors are further to:
calculate an economic impact of the plant gaps; and
provide, for display, information indicating the economic impact of the plant gaps.

7. The device of claim 1, where the one or more processors are further to:
receive the plurality of images from an unmanned aerial vehicle or a satellite.

8. A non-transitory computer-readable medium storing instructions, the instructions comprising:
one or more instructions that, when executed by one or more processors, cause the one or more processors to:
receive a plurality of images of a field on a farm;
filter the plurality of images of the field to generate a plurality of filtered images,
each image of the plurality of images being filtered in parallel with other images of the plurality of images and based on one or more filtering routines;
isolate planting lanes in the plurality of filtered images,
the planting lanes including lanes formed by crops in the field, and
the planting lanes being isolated via:
a first technique that includes a masking technique, or
a second technique that includes a sliding windows technique;
identify plant gaps in the planting lanes,
the plant gaps corresponding to portions of the planting lanes that are missing crops,
the plant gaps being identified based on a third technique when the first technique is utilized to isolate the planting lanes, and
the plant gaps being identified based on a fourth technique when the second technique is utilized to isolate the planting lanes;
superimpose the plant gaps over the plurality of images to generate a visual representation of stressed areas in the field; and
perform an action based on the visual representation of the stressed areas in the field.

9. The non-transitory computer-readable medium of claim 8, where
the third technique includes a heat mapping technique, and
the fourth technique includes the sliding windows technique.

10. The non-transitory computer-readable medium of claim 8, where the instructions further comprise:
one or more instructions that, when executed by the one or more processors, cause the one or more processors to:
receive field parameters associated with the field,
the field parameters including one or more of:
a planting lane interval parameter,
a seed density parameter,
a planting date parameter, or
a plot boundaries parameter; and
isolate the planting lanes in the plurality of filtered images based on the field parameters.

11. The non-transitory computer-readable medium of claim 8, where the instructions further comprise:
one or more instructions that, when executed by the one or more processors, cause the one or more processors to:
analyze the plurality of filtered images;
determine, based on analyzing the plurality of filtered images, whether the planting lanes include standard patterns or arbitrary patterns;
isolate the planting lanes in the plurality of filtered images via the first technique when the planting lanes include the standard patterns; and
isolate the planting lanes in the plurality of filtered images via the second technique when the planting lanes include the arbitrary patterns.

12. The non-transitory computer-readable medium of claim 8, where the instructions further comprise:
one or more instructions that, when executed by the one or more processors, cause the one or more processors to:
generate image analytics based on one or more lengths of the isolated planting lanes and the identified plant gaps, the image analytics including calculated lengths of isolated planting lanes or the identified plant gaps; and perform one or more actions based on the image analytics, the one or more actions including at least one of:

providing the image analytics for display, comparing calculated lengths of isolated planting lanes and/or the identified plant gaps with one or more predetermined thresholds, or providing an alert if the calculated length of an isolated planting lane or an identified plant gap fails to meet the one or more predetermined thresholds.

13. The non-transitory computer-readable medium of claim 8, where the action includes at least one of:

dispatching another device to reseed crops in the plant gaps, dispatching the other device to replant crops in the plant gaps, causing an irrigation system to increase a water supply to the plant gaps, causing the irrigation system to decrease the water supply to the plant gaps, dispatching the other device to apply fertilizer in the plant gaps, or dispatching the other device to apply an insecticide in the plant gaps.

14. The non-transitory computer-readable medium of claim 8, where the instructions further comprise:

one or more instructions that, when executed by the one or more processors, cause the one or more processors to:

calculate an economic impact of the plant gaps; and provide, for display, information indicating the economic impact of the plant gaps.

15. A method, comprising:

receiving, by a device, a plurality of images of a field on a farm;

filtering, by the device, an image, of the plurality of images, to generate a filtered image;

isolating, by the device, planting lanes in the filtered image, the planting lanes including lanes formed by crops in the field, and the planting lanes being isolated via a masking technique or a sliding windows technique;

identifying, by the device, plant gaps in the planting lanes, the plant gaps corresponding to portions of the planting lanes that are missing crops, the plant gaps being identified based on a heat map when the masking technique is utilized to isolate the planting lanes, and the plant gaps being identified based on sliding windows when the sliding windows technique is utilized to isolate the planting lanes;

superimposing, by the device, the plant gaps over the image to generate a visual representation of stressed areas in the field; and performing, by the device, an action based the visual representation of the stressed areas in the field.

16. The method of claim 15, further comprising:

receiving field parameters associated with the field; and where isolating the planting lanes in the filtered image includes:

isolating the planting lanes in the filtered image based on the field parameters.

17. The method of claim 15, where the filtered image is one of a plurality of filtered images and the method further comprises:

analyzing the plurality of filtered images;

determining, based on analyzing the plurality of filtered images, whether the planting lanes include standard patterns or arbitrary patterns; and where, isolating the planting lanes in the plurality of filtered images, includes one of:

isolating the planting lanes in the plurality of filtered images via the masking technique when the planting lanes include the standard patterns; or isolating the planting lanes in the plurality of filtered images via the sliding windows technique when the planting lanes include the arbitrary patterns.

18. The method of claim 15, further comprising:

generating image analytics based on one or more lengths of the isolated planting lanes and the identified plant gaps, the image analytics including calculated lengths of isolated planting lanes and/or the identified plant gaps; and performing one or more actions based on the image analytics, the one or more actions including at least one of:

providing the image analytics for display, comparing calculated lengths of isolated planting lanes or the identified plant gaps with one or more predetermined thresholds, or providing an alert if the calculated length of an isolated planting lane or an identified plant gap fails to meet the one or more predetermined thresholds.

19. The method of claim 15, where the action includes at least one of:

dispatching another device to reseed crops in the plant gaps, dispatching the other device to replant crops in the plant gaps, causing an irrigation system to increase a water supply to the plant gaps, causing the irrigation system to decrease the water supply to the plant gaps, dispatching the other device to apply fertilizer in the plant gaps, or dispatching the other device to apply an insecticide in the plant gaps.

20. The method of claim 15, further comprising:

calculating an economic impact of the plant gaps; and providing, for display, information indicating the economic impact of the plant gaps.

* * * * *